United States Patent
Yao et al.

(10) Patent No.: US 12,280,580 B2
(45) Date of Patent: Apr. 22, 2025

(54) SELF-HEALING, HYDROPHOBIC COMPOSITES AND RELATED METHODS

(71) Applicant: Northwestern University, Evanston, IL (US)

(72) Inventors: Yuehan Yao, Evanston, IL (US); Nicolas Martinez Prieto, Evanston, IL (US); Jian Cao, Wilmette, IL (US); Kyoo-Chul Park, Wilmette, IL (US); Christian John Machado, Evanston, IL (US)

(73) Assignee: Northwestern University, Evanston, IL (US)

( * ) Notice: Subject to any disclaimer, the term of this patent is extended or adjusted under 35 U.S.C. 154(b) by 625 days.

(21) Appl. No.: 17/057,805

(22) PCT Filed: May 23, 2019

(86) PCT No.: PCT/US2019/033714
§ 371 (c)(1),
(2) Date: Nov. 23, 2020

(87) PCT Pub. No.: WO2019/226877
PCT Pub. Date: Nov. 28, 2019

(65) Prior Publication Data
US 2021/0260848 A1    Aug. 26, 2021

Related U.S. Application Data

(60) Provisional application No. 62/675,925, filed on May 24, 2018.

(51) Int. Cl.
*B32B 15/14*    (2006.01)
*B32B 5/02*    (2006.01)
(Continued)

(52) U.S. Cl.
CPC .............. *B32B 5/022* (2013.01); *B32B 15/14* (2013.01); *B32B 15/20* (2013.01); *B32B 38/08* (2013.01);
(Continued)

(58) Field of Classification Search
CPC ......... B32B 5/022; B32B 15/14; B32B 15/20; B32B 38/08; B32B 2260/04;
(Continued)

(56) References Cited

U.S. PATENT DOCUMENTS 6,511,927 B1 *   1/2003   Ellis ...................... B32B 27/12
                                                                442/79
2006/0014460 A1 *   1/2006   Alexander Isele ........................
                                                                A61F 13/51401
                                                                442/85

(Continued)

OTHER PUBLICATIONS

Wu et al, "Review on electrospun ultrafine phase change fibers (PCFs) for thermal energy storage," Applied Energy, 210, pp. 167-181, Nov. 8, 2017. (Year: 2017).*
Cho et al., "Structural properties and superhydrophobicity of electrospun polypropylene fibers from solution and melt," Polymer 51 pp. 6005-6012, Oct. 20, 2010. (Year: 2010).*
(Continued)

*Primary Examiner* — Matthew D Matzek
(74) *Attorney, Agent, or Firm* — Bell & Manning, LLC (57) ABSTRACT

Self-healing, hydrophobic composites and related methods are provided. A method of repelling water may comprise forming a layer of a self-healing, hydrophobic composite comprising a porous network of entangled polymer fibers and a hydrophobic phase change material infused throughout the network, on a surface of a substrate to form a treated surface; and exposing the treated surface to water, wherein the treated surface exhibits a native water droplet contact angle which is greater than that of an untreated surface without the layer of the composite.

13 Claims, 8 Drawing Sheets

(51) Int. Cl.
  *B32B 15/20* (2006.01)
  *B32B 38/08* (2006.01)
(52) U.S. Cl.
  CPC ..... *B32B 2260/021* (2013.01); *B32B 2260/04* (2013.01); *B32B 2262/0238* (2013.01); *B32B 2307/73* (2013.01)
(58) Field of Classification Search
  CPC ........ B32B 2262/0238; B32B 2307/73; B32B 2307/762
  USPC .............. 442/85–90, 351, 414; 106/270, 271
  See application file for complete search history.

(56) References Cited

U.S. PATENT DOCUMENTS

| | | | | |
|---|---|---|---|---|
| 2006/0122313 | A1* | 6/2006 | Boylan | C08L 91/08 524/475 |
| 2018/0079944 | A1* | 3/2018 | Trifu | C01B 33/1585 |
| 2019/0053632 | A1* | 2/2019 | Chirackal | B32B 5/18 |

OTHER PUBLICATIONS

The International Search Report and Written Opinion issued on Aug. 16, 2019 for International Patent Application No. PCT/US19/33714; pp. 1-10.

T. Aida et al., "Functional Supramolecular Polymers," *Science*, Feb. 17, 2012, 335(6070); pp. 813-817.

Thu Q. Doan et al., "Characterization of core-shell microstructure and self-healing performance of electrospun fiber coatings," *Polymer*, (2016) vol. 107, pp. 263-272.

Scott C. Grindy et al., "Control of hierarchical polymer mechanics with bioinspired metal-coordination dynamics," *Nat. Mater.* Dec. 2015, vol. 14, No. 12, pp. 1210-1216.

Kyoo-Chul Park et al., "Condensation on Slippery Asymmetric Bumps," *Nature*, Mar. 3, 2016, vol. 531; pp. 78-82.

Ming Zhong et al., "Self-Healable, Tough and Highly Stretchable Ionic Nanocomposite Physical Hydrogels," Electronic Supplementary Material (ESI) for Soft Matter. The Royal Society of Chemistry, 2015, pp. S1-S5.

Ye Hong et al., "Preparation of Polyethylene-Paraffin Compound as a Form-Stable Solid-Liquid Phase Change Material," *Solar Energy Materials and Solar Cells*, Sep. 1, 2000, vol. 64, Issue 1; pp. 37-44.

* cited by examiner

SELF-HEALING, HYDROPHOBIC COMPOSITES AND RELATED METHODS

CROSS-REFERENCE TO RELATED APPLICATIONS

The present application claims priority to U.S. Provisional Patent Application No. 62/675,925 that was filed May 24, 2018, the entire contents of which are hereby incorporated by reference.

BACKGROUND

For practical applications, functional materials are required to be durable enough against mechanical wearing, oil fouling, and many other external damage factors. Multiphobic surfaces that resist mechanical scratches can be applied as surface coatings to reduce electromagnetic wave reflection, ice accumulation, contaminants, and residual volatile and explosive fuel, all variables that can significantly impact the function and safety of people, vehicles, and aircrafts. However, those functional hydrophobic surfaces are usually based on low surface energy coatings or a particular surface patterning, which can be easily removed or degraded. A practically durable, economical, and scalable solution is yet to be developed.

BRIEF DESCRIPTION OF THE DRAWINGS

Illustrative embodiments of the disclosure will hereafter be described with reference to the accompanying drawings.

SUMMARY

Self-healing, hydrophobic composites based on hydrophobic phase change materials (PCMs) and polymer fibers are provided. Paraffin wax is one example of a hydrophobic PCM that can be used in the composites.

The composites have enhanced mechanical properties compared to the hydrophobic PCM in the absence of the fibers and have increased hydrophobicity when they are subjected to mechanical damage, such as crumpling. In addition, the hydrophobicity and surface morphology of the composites can be easily restored by the local temperature control of the composite material.

The composites have applications in, for example, durable self-cleaning surfaces, water-proof coatings, energy storage, drag reduction, and renewable energy harvesting systems. For example, the composites could be used to increase the life span of superhydrophobic materials that are used for waterproof applications, infrastructure, anti-biofouling materials, and future generations of multifunctional glasses.

The composites can be characterized by one or more of the following properties: enhanced mechanical properties by fiber reinforcement; increased hydrophobicity when the material is subject to mechanical damage such as crumpling; tunable wettability; varied mechanical and optical properties by changing the fiber material, diameter, and filling density; low adhesion of intruding solids such as salt crystals evaporated from high salinity brine and cured cement particles; surface morphology and hydrophobicity are self-healable by controlling the local temperature of the system; and thermal energy can be stored by the phase change of the hydrophobic PCM at high temperature.

The composites can be prepared by infusing hydrophobic PCMs (for example, melted paraffin wax) into a polymeric fiber network (e.g., an electrospun polymeric nonwoven mesh), and then the composites can be cooled down so that the hydrophobic PCM can solidify. The fibers can be made from a variety of polymers, the diameter of which can be easily tuned by the applied voltage, concentration of pre-dissolved polymer solution, and infusing rate during electrospinning. The wettability and mechanical and optical properties of the composite are consequently tailored by tuning the properties of the hydrophobic PCM and fibers.

Advantages of the composites include one or more of the following: Unlike typical hydrophobic and superhydrophobic surfaces that degrade under mechanical abrasion, surfaces of the disclosed composites show enhanced hydrophobicity with mechanical wearing. While typical hydrophobic and superhydrophobic surfaces have limited lifetimes (i.e. damage results in end of useful lifetime), the disclosed composites have the ability to self-heal, thus increasing the number of times the composites may be used. Conventional processes that induce hydrophobicity and superhydrophobicity on surface, e.g., boehmitization and chemical vapor deposition, have very narrow material compatibility. However, the surfaces of the disclosed composites have a broad range of compatibility, leading to easy tunability and functionalization.

DETAILED DESCRIPTION

In one aspect, self-healing hydrophobic composites are provided. In an embodiment, such a composite comprises a network of entangled polymer fibers and a hydrophobic phase change material (PCM) infused throughout the network. The hydrophobic PCM fills the pores of the network to embed individual fibers within a liquid medium (above the melting temperature of the hydrophobic PCM) or a solid medium (below the melting temperature of the hydrophobic PCM). The fibers, in turn, provide a structural framework to retain the hydrophobic PCM within the network, even liquid phase hydrophobic PCM. The type of polymer, hydrophobic PCM, and optional additives in the composite may be tuned to vary the hydrophobicity of the composite surface as well as the mechanical, thermal, and optical properties of the composite.

The fibers of the network comprise a polymer. Polymers are selected based on an ability to form fibers having a high tensile strength; ability to form fibers having a dimension (e.g., diameter or length) in the sub-micron to micron scale; relative insolubility in the selected hydrophobic PCM; and possessing intrinsic hydrophobicity. Illustrative polymers include polyethylene, poly(ethylene oxide) (PEO), polypropylene, poly(vinylidene fluoride) (PVDF), poly-paraphenylene terephthalamide, polyamide, and cellulose. However, in embodiments, the fibers do not comprise cellulose.

Figure 1:
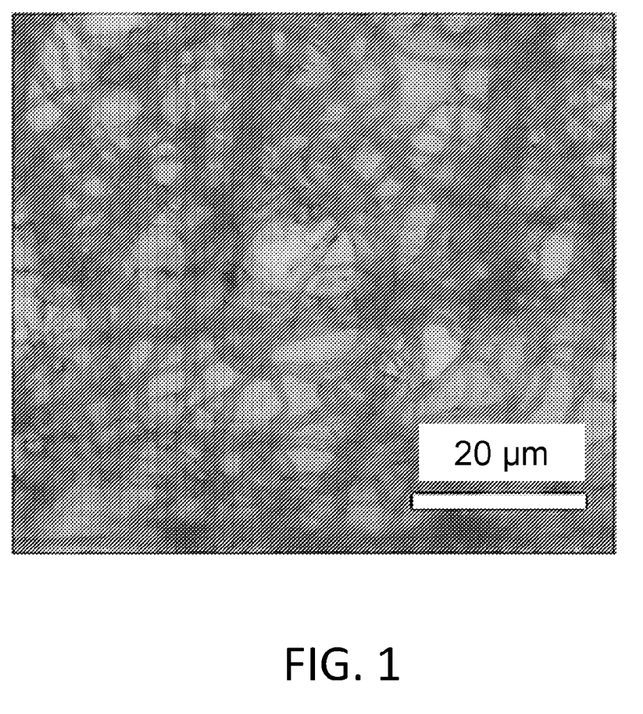
FIG. 1 shows an optical image of electrospun polyethylene oxide (PEO) fibers. Operating conditions were 8 kV at distance of 170 mm from tip to collector. PEO concentration was 5 wt %, and $M_v$=600,000. Scale bar represents 20 μm.
Figure 2A:
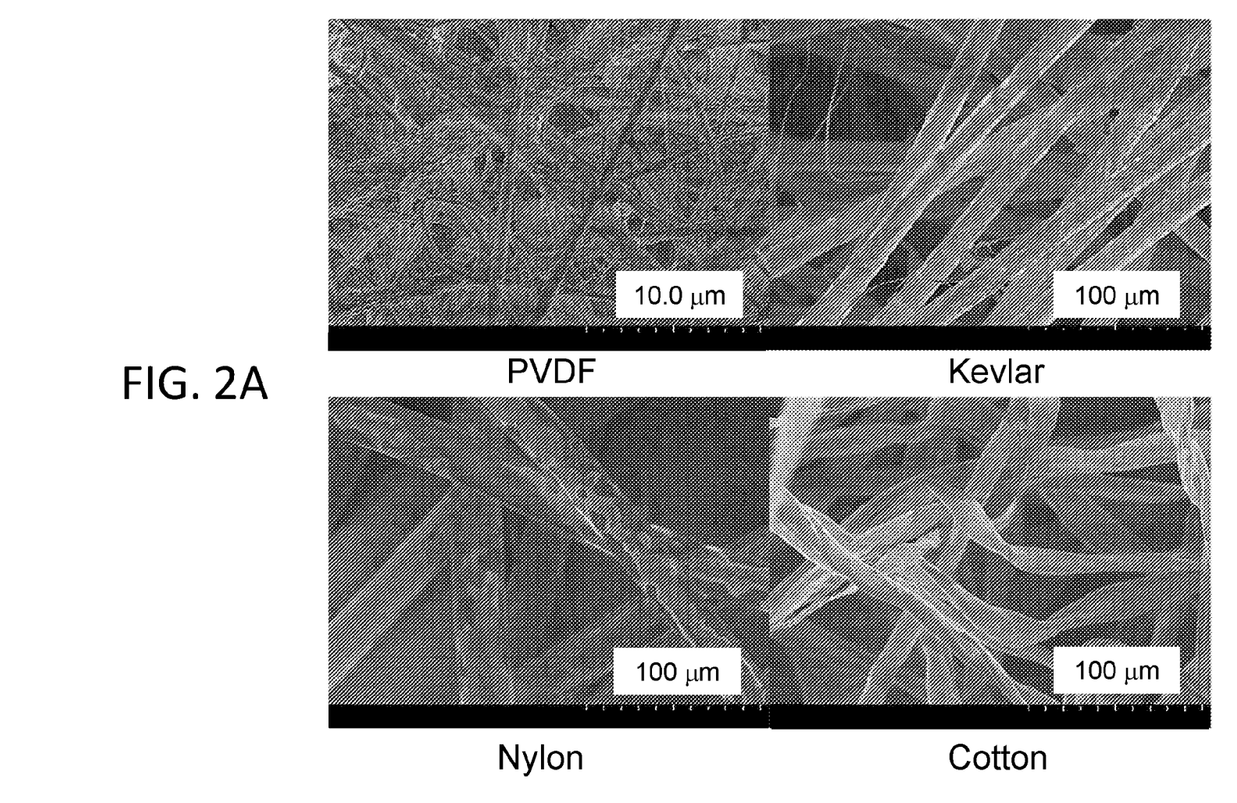
FIG. 2A shows SEM images of four fiber types
Figure 2B:
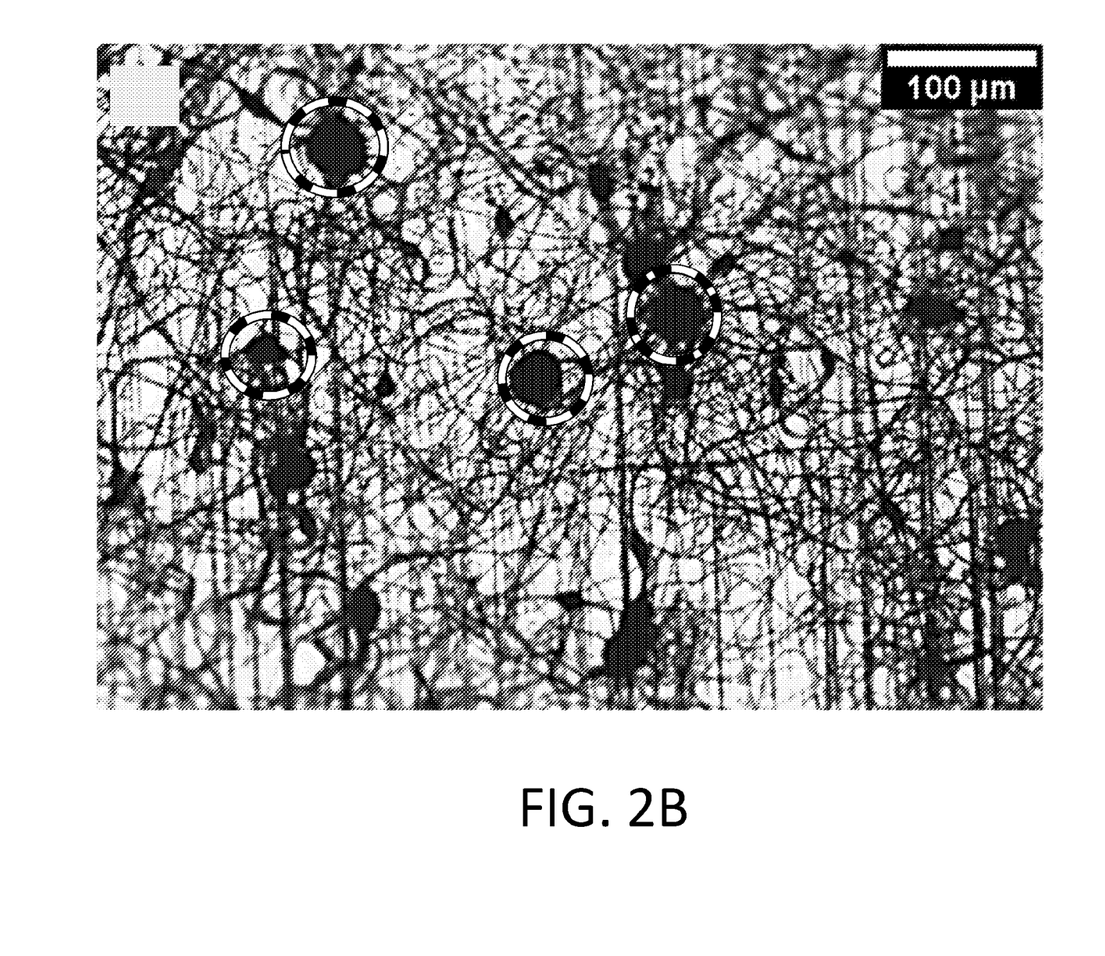
FIG. 2B shows an SEM image of an electrospun PVDF mat with some PVDF beads distributed in the mat indicated by dashed circles.

The polymer fibers may be electrospun, by which it is meant the fibers have been formed using electrospinning, a method which uses electric force to draw charged threads or filaments of polymer solutions or polymer melts and deposit them onto a surface of a target. As described in the Examples, below, the electrospinning conditions and composition of the polymer solution/melt may be used to adjust the fiber diameter, fiber morphology, and fiber density within the network. The form of the network may be a layer or mat. The thickness and lateral dimensions of the layer/mat may also be tuned via the electrospinning conditions. The thickness of the layer/mat may be in a range of from 10 μm to 5 mm; 10 μm to 1 mm; 10 μm to 500 μm; or from 10 μm to 100 μm. An illustrative network of entangled electrospun PEO fibers in the form of a layer/mat is shown in FIG. 1. A layer/mat of PVDF electrospun fibers is shown in FIG. 2B.

As noted above, the fiber diameter, morphology, and density of the polymer fibers may be adjusted. In embodiments, the fibers have an average diameter in a range of from 100 nm to 300 μm. This includes an average diameter of 500 nm to 20 μm and 1 μm to 10 μm. As shown in FIG. 2B, in embodiments, some of the electrospun fibers may aggregate to form beads distributed throughout the layer/mat. The number and size of the beads can be controlled by the electrospinning conditions such as the applied voltage. In embodiments, the beads have an average diameter in a range of from 10 μm to 75 μm or from 25 μm to 50 μm. In embodiments, the fibers are present in the composite in an amount of from 10% to 50% or from 20% to 40% by volume.

Figure 4A:
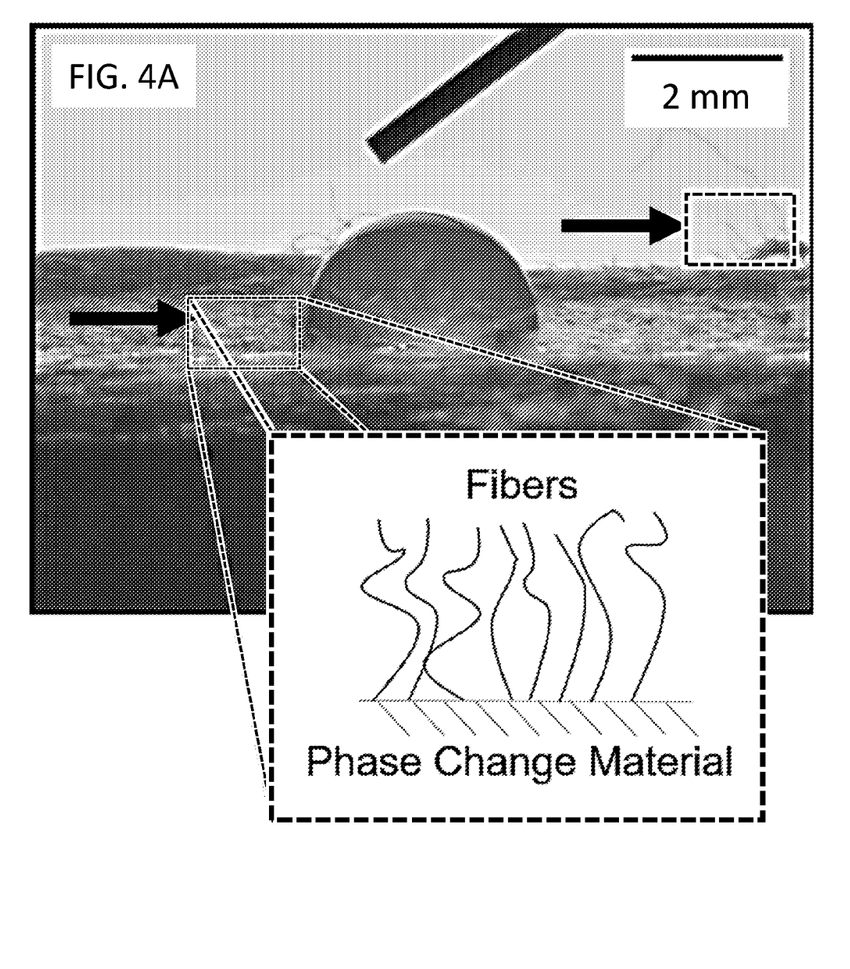
FIG. 4A is an image of a mechanically degraded cotton-wax composite undergoing contact angle testing. As schematically illustrated with the inset, the composite had orthogonally oriented fibers projecting from the surface of the composite.

As shown in FIG. 4A, in embodiments, some of the fibers of the network may project away from the surface of the composite. The orientation of these fibers may be generally orthogonal with respect to the plane of the underlying polymer network/composite while the other fibers of the network may be generally aligned within the plane of the polymer network/composite. As described in the Examples, these orthogonal fibers can increase surface roughness, increase hydrophobicity, and increase the resistance of the underlying polymer network/composite to icing/frosting.

Various hydrophobic phase change materials may be used in the composite. The hydrophobic PCM is selected based on having a relatively low melting point (between 10-90° C.), which minimizes the energy required to induce self-healing; possessing intrinsic hydrophobicity; and possessing relatively low toxicity, which allows for use of the composite across numerous applications. An illustrative phase change material is paraffin.

In embodiments, the composite consists of, or consists essentially of, the polymer fibers and the hydrophobic PCM.

Although the specific properties of the composite are tunable as described above, the composites are characterized by being hydrophobic. The hydrophobicity may be quantified by an average water droplet contact angle. Standard, known techniques may be used to measure water droplet contact angles; see also the Examples, below. In embodiments, the composites are characterized by an average water droplet contact angle of at least 100°, at least 110°, at least 120°, at least 130°, at least 140°, or in a range of from 100° to 174°. In embodiments, the composites exhibit increased hydrophobicity after being subjected to mechanical deformation, i.e., a mechanical force that alters the shape of the composite, e.g., abrading, bending, twisting, crumpling, etc. The water droplet contact angles as measured prior to mechanical deformation (or any use of the composite at all) may be referred to as being associated with the original "native" composite and may be referred to as native water droplet contact angles. The water droplet contact angles as measured after mechanical deformation may be referred to as being associated with the "deformed" composite.

The composites may also be characterized by their mechanical strength. The mechanical strength may be quantified by a uniaxial tensile strength, measured as described in the Examples, below. In embodiments, the composites are characterized by a uniaxial tensile strength of at least 1 MPa, at least 2 MPa, at least 3 MPa, at least 10 MPa, at least 25 mPa or in the range of from 0.5 MPa to 54 MPa. These values may refer to the composites as being measured prior to mechanical deformation or any use at all and may be referred to as native uniaxial tensile strengths.

In another aspect, methods of making the composites are provided. The composites may be made by exposing the network of entangled polymer fibers to the hydrophobic PCM in its liquid phase for a period of time to infuse the network with the hydrophobic PCM. The hydrophobic PCM is then cooled to a temperature below its melting temperature to solidify the hydrophobic PCM and provide the composite. Exposing the network may be accomplished in a variety of ways, e.g., dipping, soaking, etc. the network in the hydrophobic PCM or flowing, pouring, etc., the hydrophobic PCM onto the network. Composites in the form of a layer/mat may be formed by carrying the steps of the method on a desired substrate. In this case, the composites may effectively provide a coating on the surface of the substrate. The method may further include forming the network of entangled polymer fibers, e.g., by electrospinning.

Figure 3A:
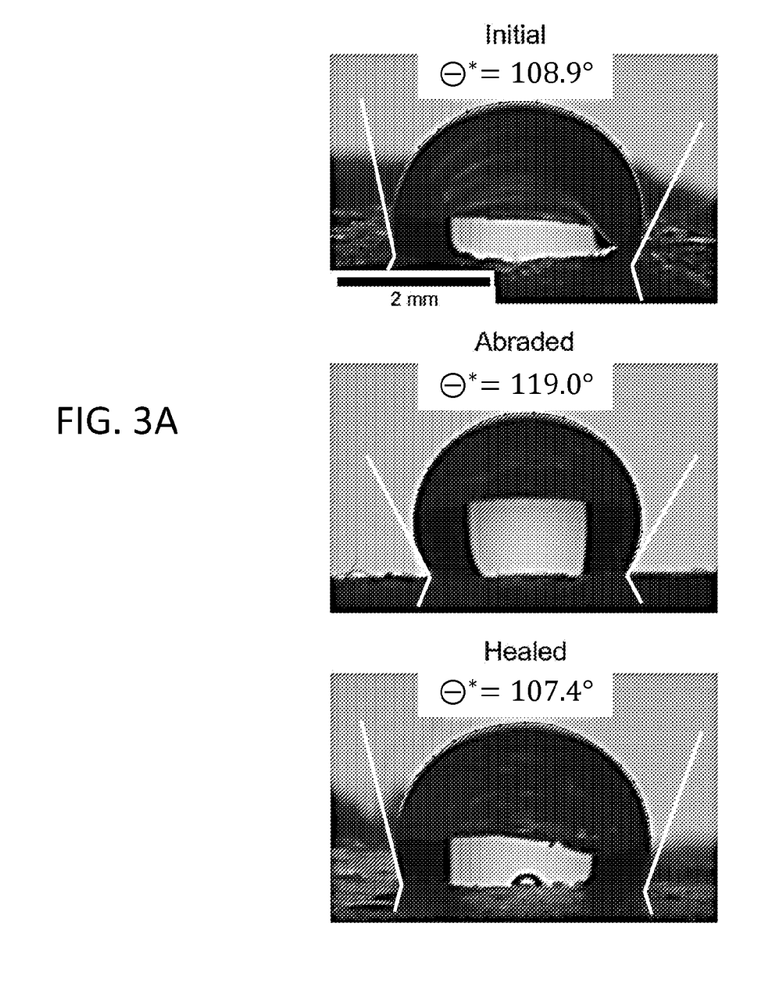
FIG. 3A shows contact angle measurements for three separate surface conditions on a cotton-wax composite. The scale bar corresponds to 2 mm. Contact angles were calculated using the ImageJ Dropsnake plugin, yielding two separate contact angles on the left and right sides of the droplets. The two contact angle results were averaged to calculate a single contact angle for each condition.
Figure 3B:
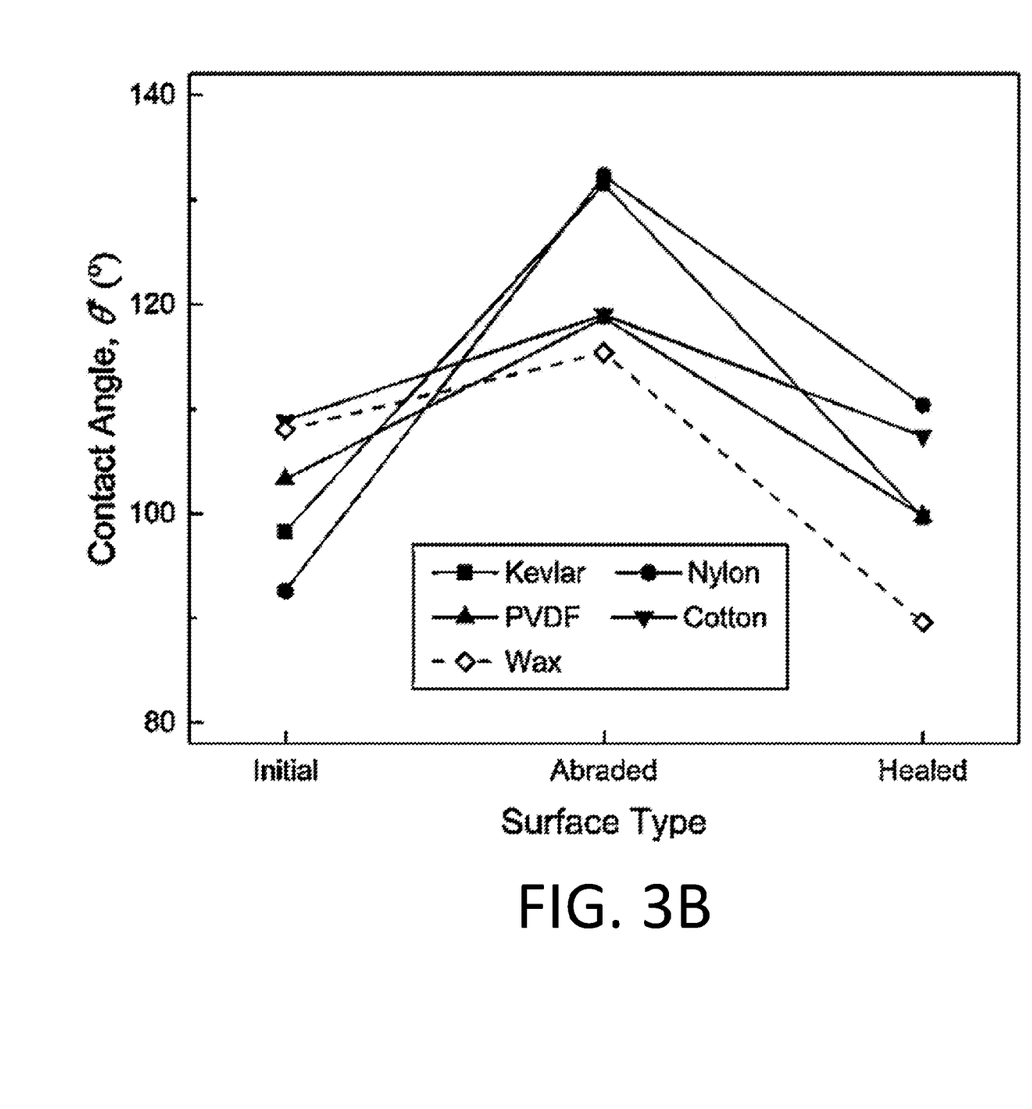
FIG. 3B show the results of the measurements for all samples.

Over a period of time or a period of use, the composites may become physically or functionally altered or damaged. The original, native physical form and original, native properties (e.g., hydrophobicity) may be recovered by heating the composite to a temperature and for a period of time to melt the hydrophobic PCM, followed by cooling the composite to solidify the hydrophobic PCM. Melting does not necessarily mean the hydrophobic PCM need to completely melt or that the temperature needs to be greater than the melting temperature of the hydrophobic PCM as even a reduced viscosity/softened hydrophobic PCM may be sufficient. The temperature and period of time depends upon the selected hydrophobic PCM and dimensions of the composite. The temperature may be, e.g., 50° C., 60° C., 70° C., etc. The time may be in a range of from 1 minute to 10 minutes, depending upon the selected temperature. Thus, the composites are referred to as "self-healing." This self-healing nature of the composites is illustrated in FIGS. 3A-3B and is further described below. FIG. 3A shows that an original, native composite is characterized by a water droplet contact angle (top image) which becomes altered due to mechanical abrasion (middle image), but which may be restored to its original value using heat (bottom image). That is, the water droplet contact angle of the native composite and the self-healed composite are the same (e.g., within ±3°). A plot of contact angle values illustrates this phenomenon in FIG. 3B.

In another aspect, methods of using the composites are provided. The composites find use in a variety of applications, some of which are noted in the Examples below. Due to their hydrophobic nature, the composites find use in water-proofing, self-cleaning, anti-icing, and anti-biofouling applications. Thus, the composites may be used to repel water, to convert hydrophilic surfaces to hydrophobic ones, and/or to increase the hydrophobicity of surfaces. An embodiment of such methods comprises forming (e.g., using the methods described above, or depositing or otherwise placing) a layer of any of the composites disclosed herein on a surface of a desired substrate). Upon exposure to water (or an aqueous solution or mixture), the treated surface repels water and exhibits a greater hydrophobicity as compared to the untreated surface (the same surface without the layer of the composite). This may be confirmed by water contact angle measurements as described above. As described above, the methods may further comprise heating the composite to a temperature and for a period of time to melt the hydrophobic PCM, followed by cooling the composite to solidify the hydrophobic PCM. The reformed/restored composite may be used again in water repelling applications and the water exposure/heating steps may be repeated multiple times.

EXAMPLES

It is fundamentally important to design robust multiphobic surfaces that can adapt to a range of mechanical, thermal, and electromagnetic stimuli. The fundamental scientific problem to be addressed by the work in these Examples is that the state-of-the-art surfaces, such as superhydrophobic surfaces or slippery liquid infused porous surfaces (SLIPS), possess intrinsic limits associated with the mechanical scratches that can occur during system operation. Specifically, a several-nanometer-thick hydrophobic coating on top of superhydrophobic surfaces and SLIPS is easily removed by mechanical scratching. Even the lubricant on SLIPS is easily removed under high shear conditions and, in any event, cannot block mechanical contact between ice and the underlying surface texture, resulting in the loss of the thin hydrophobic coating covered with the lubricant.

To overcome the fundamental limits associated with the state-of-the-art multiphobic surface designs and to achieve an ultimate goal of unprecedented multi-functionalities, the main point of this Example is to demonstrate that fiber-reinforced, hydrophobic PCMs can bypass the difficulties posed by high shear conditions and mechanical contact on sophisticated new surfaces—by incorporating these difficulties themselves as new stimuli. The surface system proposed is based on an approach that is conceptually different from the lotus leaf-inspired, superhydrophobic surfaces (textured surfaces+hydrophobic coating+air) and pitcher plant-inspired SLIPS (textured surfaces+hydrophobic coating+lubricant) that have been described in the past. For instance, the surface system proposed here does not depend on the extremely thin hydrophobic coatings. Instead, a hydrophobic material itself is incorporated as a filling material into a micro/nano fiber network (textured surfaces+hydrophobic PCM) to significantly reinforce the hydrophobic material. In addition, the melting temperature of the solid hydrophobic filling material can be used to program additional functionalities (for example, self-healing property and tunable optical transparency). Furthermore, the fiber network can be designed to be responsive to other external stimuli, which would produce unprecedented multi-functionality when combined with the thermally-responsive nature of hydrophobic PCMs.

Example 1

Electrospun Polymer Fibers. As a preliminary result, the feasibility of producing polymer fibers by electrospinning is demonstrated here. FIG. 1 shows the optical image of electrospun PEO fibers from a 5 wt % PEO aqueous solution. The process was run under 8 kV at a distance of 170 mm from the tip to the collector, and the solution was infused at a rate of 40 µL/min. The diameter of the electrospun fibers is around 1 µm. The diameter and morphology of the fibers can be further optimized by varying applied voltage, PEO molecular mass and concentration, distance from the tip to collector, and rate of infusion, depending on the desired property of the composites.

Fiber Reinforced Composites. The composite can be made by soaking the as-prepared electrospun fibers into molten paraffin wax under 90° C. for 30 min. The fibers are then pulled out from liquid and naturally cooled down to room temperature. This method gives a paraffin-fiber composite system. To test this idea, a 3 cm×3 cm piece of weighing paper was treated by paraffin as described above. Papers were composed of cellulose fibers which exhibit similar texture and dimensions as the electrospun PEO fibers. The following results are based on this the test wax-paper system.

Wettability. The equilibrium contact angles of water (7 µL) on different surfaces were obtained. Untreated paper is hydrophilic by nature due to the cellulose fibers. Therefore, it shows superhydrophilicity with a contact angle close to 0°. When paraffin is infused in the fibrous structure, the surface chemistry changes to hydrophobic and shows a contact angle of 111°. Hydrophobic coatings are usually non-resistant to mechanical damage, and the surfaces can easily be changed to hydrophilic via mechanical damage. However, the paraffin infused paper composite shows enhanced hydrophobicity when crumpled. The measured apparent contact angle was measured to be as high as 137°, which is close to superhydrophobic surfaces.

Self-Healing Property. Self-healable multifunctional surfaces are extremely rare. The paraffin-fiber composite shows excellent self-healing when the exterior hydrophobicity is lost due to scratching or wearing. For example, the surface chemistry and texture of superhydrophobic surfaces are often destroyed during the intrusion and successive removal of deposited solids, such as salt crystals from evaporated high salinity brine, as well as cement particles cured on the surface. However, the paraffin-fiber composite provides a solution to such problems because of the phase change property of paraffin. As a preliminary result, the paraffin infused paper was mechanically damaged by crumpling, producing multiple creases on the surface of the composite (observed as white lines in optical images, not shown). By subjecting the damaged composite to only 5 seconds of treatment under a 100 W infrared lamp, the creases disappeared.

Example 2

Methods and Experiments

Electrospinning Fiber Mats. Electrospun fiber mats were produced using Poly(vinylidene fluoride) (PVDF) with a molecular weight, $M_w$=534,000. PVDF was chosen for its hydrophobicity, compatibility to paraffin wax, and its piezoelectric capabilities. PVDF was solvated at 15 wt % in 60:40 vol % Dimethyl sulfoxide (DMSO):Acetone. Once dissolved, the PVDF solution was electrospun at an operating voltage of 10 kV and a working distance of 10 cm (distance from tip to collector) onto a thin aluminum sheet. A constant infusion rate was set at 0.25 mL/hr and the process was run until mats roughly 100 μm in thickness were produced (~8 hours). The fiber diameter, which is dependent on the electrospinning process parameters noted, was determined using Scanning Electron Microscopy (SEM).

In addition to electrospun PVDF fiber mats, commercial fibers were obtained and used as is including Kevlar (Polyparaphenylene terephthalamide), nylon (polyamide), and cotton (cellulose). The fiber diameters for each were determined using SEM.

Wax Coating. The fiber mats were dip-coated into liquid paraffin wax, which had been heated to 70° C. The fiber-wax composites were removed slowly by hand and allowed to cool to room temperature until the paraffin wax fully solidified.

Contact Angle Measurement. The solidified wax-fiber composites were placed on a backlit motion-controlled stage (Thorlabs). A syringe pump (Harvard Apparatus Pico Plus Elite) deposited a droplet onto a flat region of each composite. Images of each droplet's silhouette were taken using a DSLR (Nikon D5500) with a 105 mm macro lens. The ImageJ Dropsnake plugin analyzed the apparent contact angles of the droplets for three surface conditions: (1) initially, (2) after abrasion, and (3) after self-healing. The initially fabricated surfaces were pristine from defects; abrasion was applied to surface using a coarse sandpaper (80 grit); and self-healing was accomplished via direct heating with a tungsten light source.

Self-Healing. The phase change of paraffin wax from solid to liquid was induced by a conventional Tungsten light source that locally heated the surface to greater than 40° C. The liquid phase paraffin wax resolved the mechanical abrasions/degradation to yield a smooth surface after heat treatment.

Quantitative Strength Analysis. The fiber reinforced composites were subjected to tensile and abrasion testing to quantify their mechanical durability. The tensile strength of each of the composites (Kevlar, nylon, cotton, and PVDF) was determined using a custom-built micro-tensile tester. The force required to induce complete fracture normal to the fiber direction was experimentally observed for each surface, and was subsequently normalized to the cross-sectional area of each sample.

In addition to tensile strength, the composite surfaces underwent abrasion testing to determine their resistance to mechanical wear. A tribometer (CETR UMT2 Tribometer) was used to apply a constant friction force to the surface, but, due to practical limitations of the tribometer (requiring the samples to be free of large-scale roughness), only the wax-infused PVDF composite was tested. A ~100 μm thick PVDF mat was dip-coated in paraffin wax and used as the sample. To compare degradation patterns, a homogenous paraffin wax surface was also prepared. The tribometer utilized a velocity of 10 mm/sec, applying 3 N constantly over the span of 3 minutes. Degradation patterns were qualitatively examined.

Results and Discussion

Electrospun PVDF. Optimization of the electrospinning process consisted of varying polymer concentration, solution type, and operating voltage. 15 wt % was established as the optimal polymer concentration due to the viscosity and electrical conductance of the resultant solution. Polymeric solutions were dissolved in varying concentrations of Dimethyl formamide (DMF), DMSO, and Acetone, before a 60:40 vol % DMSO:Acetone was identified as the optimal solvent that produced fibers of desirable length scale and minimal beading.

The electrospun PVDF, as well as the Kevlar, nylon, and cotton, were analyzed using SEM. FIG. 2A shows the SEM images of each fiber mat. The SEM images were used to quantify the fiber diameters for each mat. PVDF had an average fiber diameter of $d_p$=1.164 μm±0.527 μm. The next smallest fiber diameter was Kevlar, which had an average fiber diameter of $d_k$=15.139 μm±0.765. Cotton had an average fiber diameter of $d_c$=15.776 μm±2.371 μm. Nylon had the largest fibers with an average fiber diameter of $d_n$=28.453 μm±1.662 μm.

FIG. 2B shows an optical image of electrospun PVDF, showing bead formation (dotted circles). Bead formation was inversely related to operating voltage (lower voltage resulted in greater beading). The maximum voltage used was 10 kV, and identified as the optimal condition, although beading was still observed. However, beading is advantageous as it provides a hierarchical surface topography (surface features have different length scales) that can enhance surface roughness and increase hydrophobicity.

Contact Angle Measurements. Contact angle measurements were conducted on all fiber-wax composites using the three surface types previously outlined: (1) the pristine surface, (2) the abraded surface, and the (3) self-healed surface. FIG. 3A shows an image of a water droplet and the contact angle measurement for the cotton-wax composite as measured on the pristine surface (top), the abraded surface (middle) and the healed surface (bottom). FIG. 3B compiles the experimentally obtained contact angles for each composite surface as well as the homogenous wax sample without any fibers (dashed line). All samples, including the wax, exhibited improved hydrophobicity after mechanical abrasion was applied, due to increased roughness of the wax layer. However, the fiber composite samples exhibited greater hydrophobicity enhancement (resulting in larger apparent contact angles). This is because the abrasion process exposed some of the micro-scale fibers, resulting in even greater degree of roughness. All samples were also exposed to heat treatment that resulted in reduced apparent contact angles. The wax only sample completely deformed during heat treatment, while the fiber composites maintained their shape. This shows that the fiber network is integral to maintaining surface structural rigidity while the surrounding medium undergoes the solid to liquid phase change. The results of FIG. 3B reveal the two main properties of the wax-fiber composites (1) scratch-enhanced hydrophobicity and (2) restoration of the original surface properties via thermal treatment (i.e. self-healing).

Icing Degradation. Icing degradation studies were conducted in which a water droplet was deposited on the composite and allowed to freeze and then physically removed. In total, 20 droplets were deposited, frozen and removed from the surface (a single deposition-freeze-removal=1 icing cycle). Images obtained (not shown) revealed that surface degradation due to ice removal was limited, but ice adhesion to the surface increased with each icing cycle as the surface roughness increased. Although this loss of resistance to ice formation would signal the end of most materials' optimal lifetimes, the present composites can be easily heat treated to liquefy the paraffin layer and convert the surface to its original form. This is shown in FIG. 3A in which the contact angle of the healed surface (bottom) is essentially the same as the original surface (top).

Figure 4B:
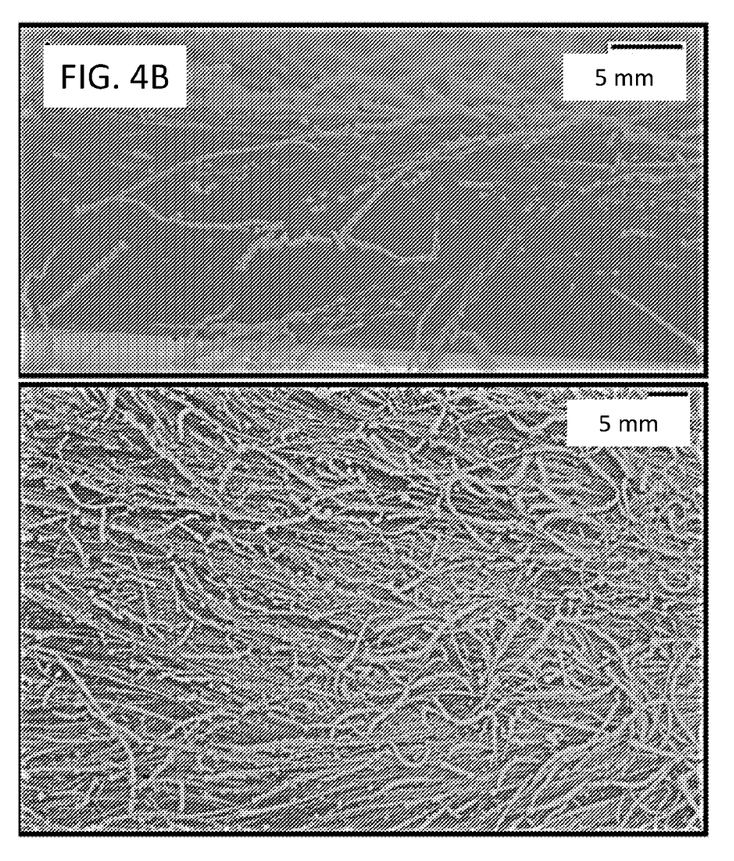
FIG. 4B shows images of frosting experiments conducted on synthetic furs having the same orthogonal fiber orientation as the cotton-wax composite. The upper image is a side-view image of the fur after frosting was observed. The lower image is a top-down image of the same fur.

It was observed that mechanical degradation, whether through ice removal or mechanical abrasion, resulted in exposed fibers projecting from the surface of the composites. As shown in FIG. 4A, these exposed fibers were oriented orthogonal to the surface, mimicking the furs of mammals such as polar bears. Therefore, synthetic fur was used to model the frosting pattern of a surface having orthogonally oriented fibers. As shown in FIG. 4B, frosting occurs only on the exposed orthogonally oriented fibers of the fur, resulting in a frost-free layer underneath. The same mechanism is expected to apply to the fiber-wax composites in which the orthogonally oriented fibers will hinder icing on the solid surface, thereby increasing its working lifetime.

Figure 5:
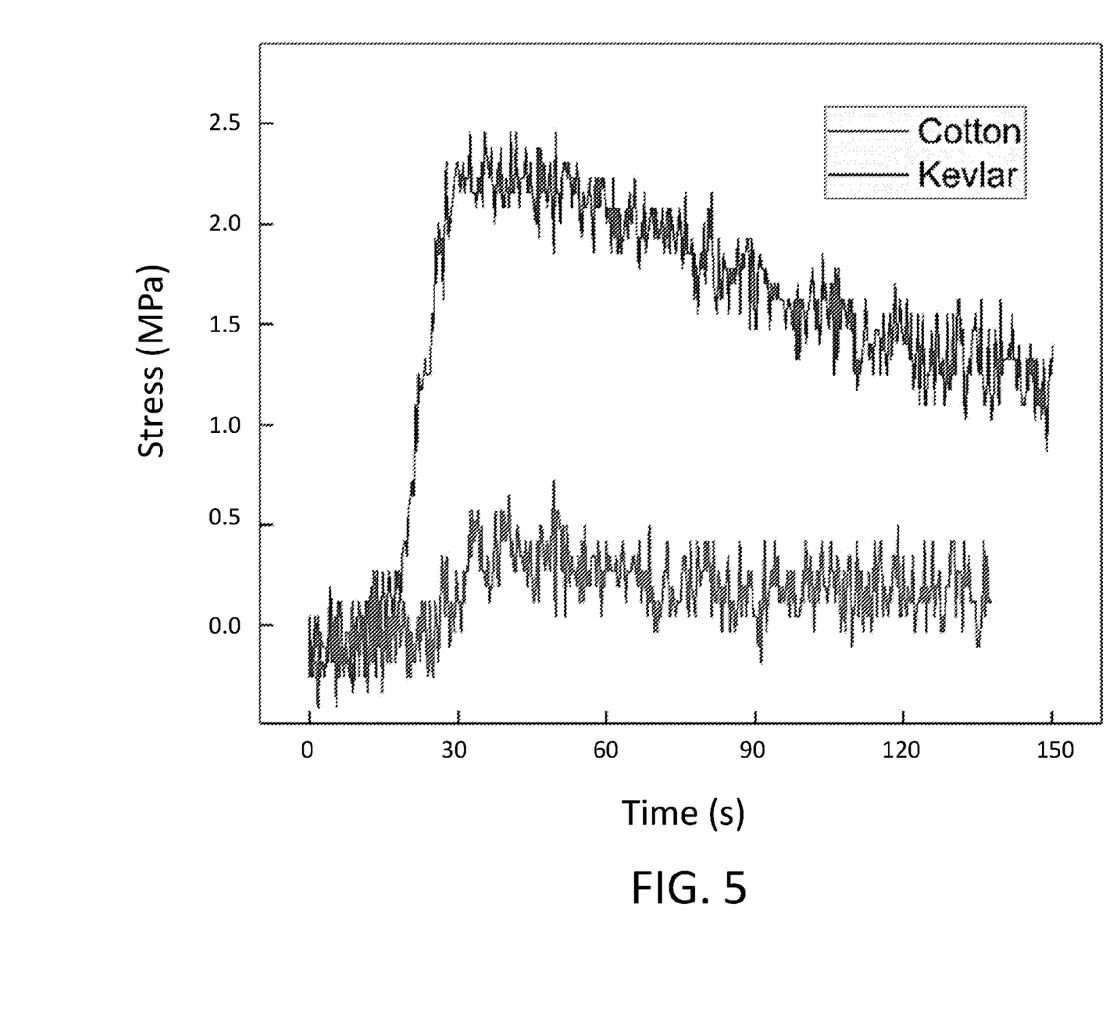
FIG. 5 shows a plot of applied stress over time for Kevlar and cotton composites. As the wax-only sample was too brittle to be accurately measured, it was assumed to have a uniaxial tensile strength of 0 MPa. Each curve on the plot exhibited a maximum stress value that corresponds with the time point immediately before fracture was induced. This is representative of the maximum stress that can be withstood by the sample before plastic (or irreversible) deformation occurs.

Quantitative Strength Analysis. Fiber-wax composites were tested using a micro-tensile tester and compared with the experimentally obtained value for a wax-only sample. All samples were fabricated to the same dimensions. The Kevlar composite possessed the highest fracture stress in uniaxial tensile testing, experimentally measured to be 2.4 MPa. The next highest was the cotton composite, which had a fracture stress of 0.8 MPa. The results for both composites are shown in FIG. 5. The wax-only and PVDF composites were extremely brittle, fracturing immediately at the start of the test. The results showed that the uniaxial tensile strength of the Kevlar composite was at least 10 times greater than that of the wax-only sample and the tensile strength of the cotton composite was at least 3 times greater than that of the wax-only sample.

A tribometer was used to apply constant friction to the surface of two samples (the PDVF composite and the wax-only sample), and the resultant abrasion was qualitatively analyzed. It was determined that other fiber composites were too rough to accurately measure abrasion resistance using the tribometer because the applied force would no longer be constant. The two samples were subjected to 3 N normal forces, applied by a steel ball bearing rotating at 10 mm/sec, for 3 minutes. The resulting abrasion patterns were qualitatively evaluated (images not shown). The PVDF composite showed minimal abrasion, largely showing just an indentation of the ball bearing on the surface. However, the homogenous wax sample exhibited a much greater degree of abrasion, with the wax layer completely degrading underneath the ball bearing's trajectory, fully exposing the underlying aluminum substrate. These results show that the fiber network of the composite samples effectively counteracts mechanical abrasion and increases the composites' resistance to mechanical wear.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. A method of repelling water, the method comprising:
   forming a layer of a self-healing, hydrophobic composite on a surface of a substrate to form a treated surface, the composite consisting of a porous network of entangled polymer fibers, the porous network defining pores between outer surfaces of the entangled polymer fibers, and a hydrophobic phase change material infused throughout the porous network and filling the pores to embed individual fibers of the entangled polymer fibers within the hydrophobic phase change material, wherein the layer consists of the entangled polymer fibers and the hydrophobic phase change material, and further wherein the hydrophobic phase change material consists of paraffin;
   exposing the treated surface to water, wherein the treated surface exhibits a native water droplet contact angle which is greater than that of an untreated surface without the layer of the composite; and
   wherein the method further comprises heating the layer to a temperature and for a period of time to melt the hydrophobic phase change material, followed by cooling the layer to solidify the hydrophobic phase change material and form a restored composite.

2. The method of claim 1, wherein the water droplet contact angle of the treated surface with the layer of the restored composite is the same as the native water droplet contact angle.

3. The method of claim 1, further comprising repeating the water exposure step on the treated surface with the layer of the restored composite.

4. The method of claim 1, wherein the fibers comprise polyethylene, poly(ethylene oxide) (PEO), polypropylene, poly(vinylidene fluoride) (PVDF), poly-paraphenylene terephthalamide, polyamide, cellulose, or combinations thereof.

5. The method of claim 1, wherein the fibers do not comprise cellulose.

6. The method of claim 1, wherein the fibers are electrospun.

7. The method of claim 6, wherein the fibers have an average diameter in a range of from 1 μm to 30 μm.

8. The method of claim 7, wherein the layer has a thickness in a range of from 10 μm to 500 μm.

9. The method of claim 6, wherein some of the fibers have aggregated to form a plurality of beads distributed throughout the network.

10. The method of claim 6, wherein some of the fibers project away from a surface of the layer and are oriented orthogonal to a plane defined by the layer.

11. The method of claim 1, wherein the native water droplet contact angle is at least 100° and no greater than 174°.

12. The method of claim 1, wherein the layer has a native uniaxial tensile strength of at least 1 MPa.

13. The method of claim 1, wherein the fibers consist of polyethylene, poly(ethylene oxide) (PEO), polypropylene, poly(vinylidene fluoride) (PVDF), poly-paraphenylene terephthalamide, polyamide, cellulose, or combinations thereof.

* * * * *